United States Patent [19]

Hereford

[11] Patent Number: 5,064,172

[45] Date of Patent: Nov. 12, 1991

[54] STRINGING BLOCK

[76] Inventor: William R. Hereford, 145 Gold St., Ishpeming, Mich. 49849

[21] Appl. No.: 499,598

[22] Filed: Mar. 23, 1990

[51] Int. Cl.⁵ .............................................. A63B 35/03
[52] U.S. Cl. .......................................... 254/134.3 PA
[58] Field of Search ................................. 248/65, 70; 254/134.3 R, 134.3 PA

[56] References Cited

U.S. PATENT DOCUMENTS

| | | | |
|---|---|---|---|
| 2,188,715 | 1/1940 | Ingram | 254/134.3 PA |
| 2,613,256 | 10/1952 | Thomas | 254/134.3 PA |
| 2,946,559 | 7/1960 | Pickett | 254/134.3 PA |
| 3,130,958 | 4/1964 | McAuley | 254/134.3 PA |
| 3,545,724 | 12/1970 | Wright | 254/134.3 PA |
| 3,918,685 | 11/1975 | Lindsey et al. | 254/134.3 PA |
| 4,844,419 | 7/1989 | Danielsson | 254/134.3 PA |

FOREIGN PATENT DOCUMENTS

| | | | |
|---|---|---|---|
| 2593332 | 7/1987 | France | 254/134.3 R |
| 1346215 | 2/1974 | United Kingdom | 254/134.3 R |
| 2169151 | 7/1986 | United Kingdom | 254/134.3 R |

Primary Examiner—Gary L. Smith
Assistant Examiner—Michael J. Milano
Attorney, Agent, or Firm—Michael, Best & Friedrich

[57] ABSTRACT

A stringing block adapted to be mounted on a utility pole having at least one crossarm. The stringing block supports a cable on the crossarm while the cable is drawn into tension and can be used to position the relatively taut cable into contact with a grooved insulator.

20 Claims, 3 Drawing Sheets

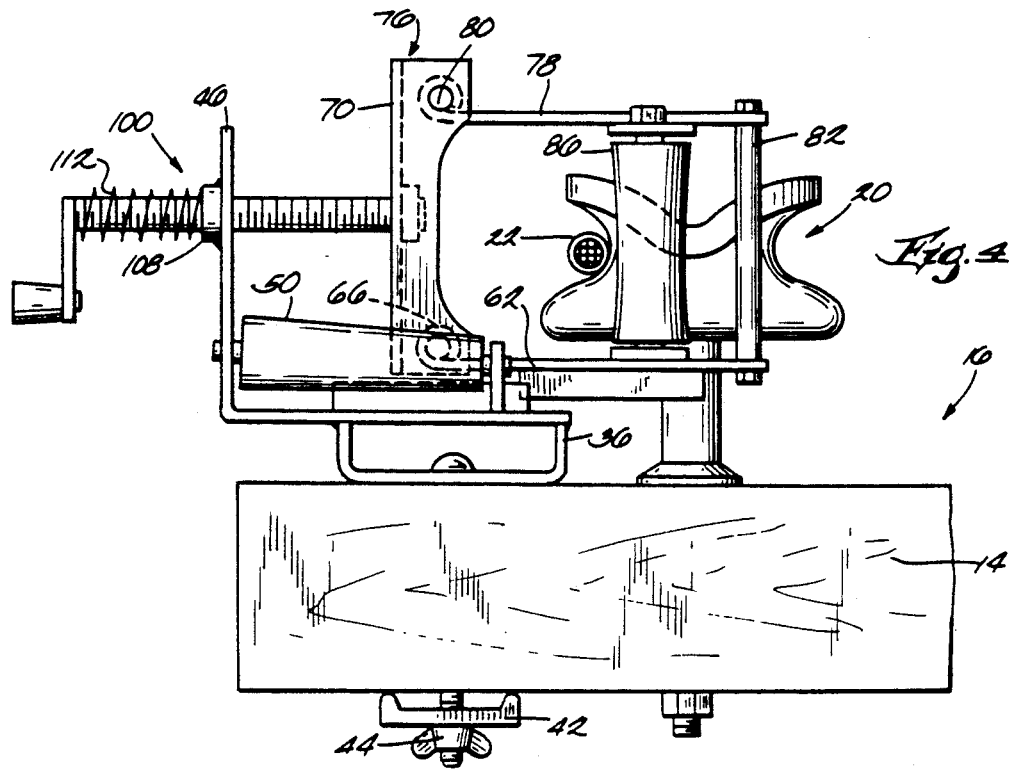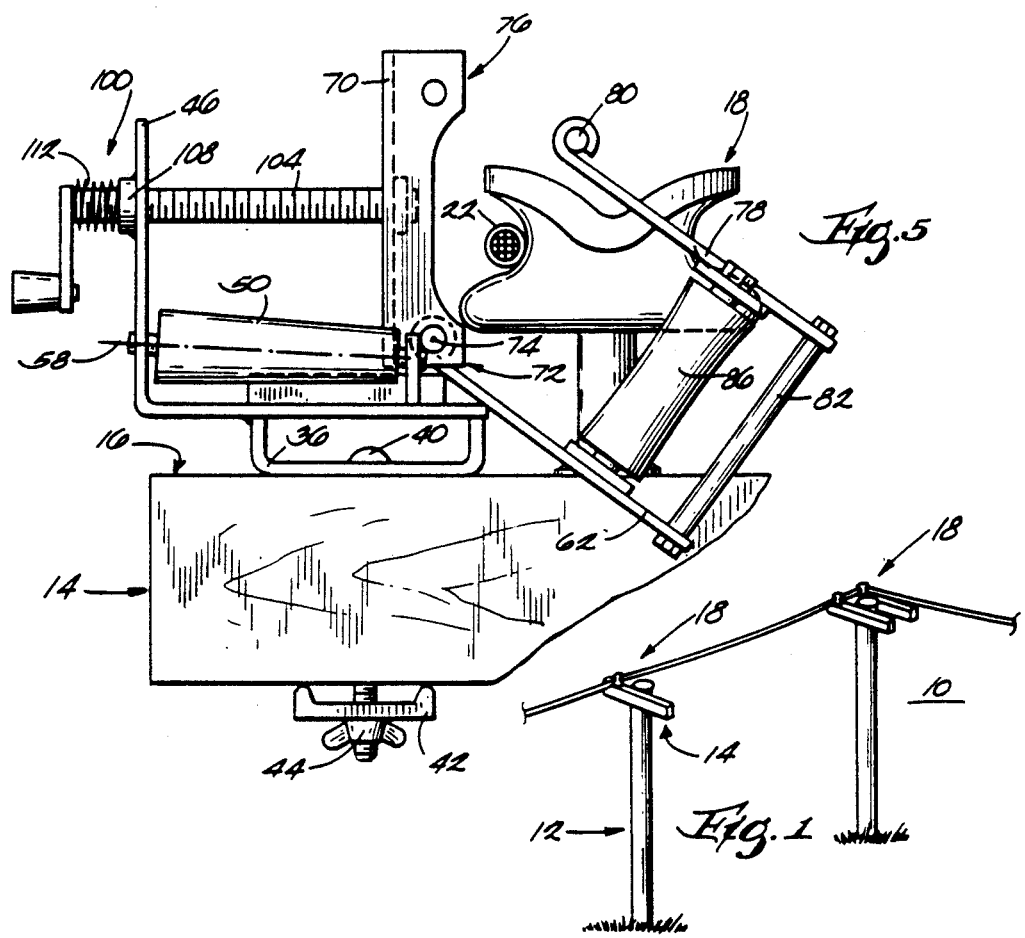

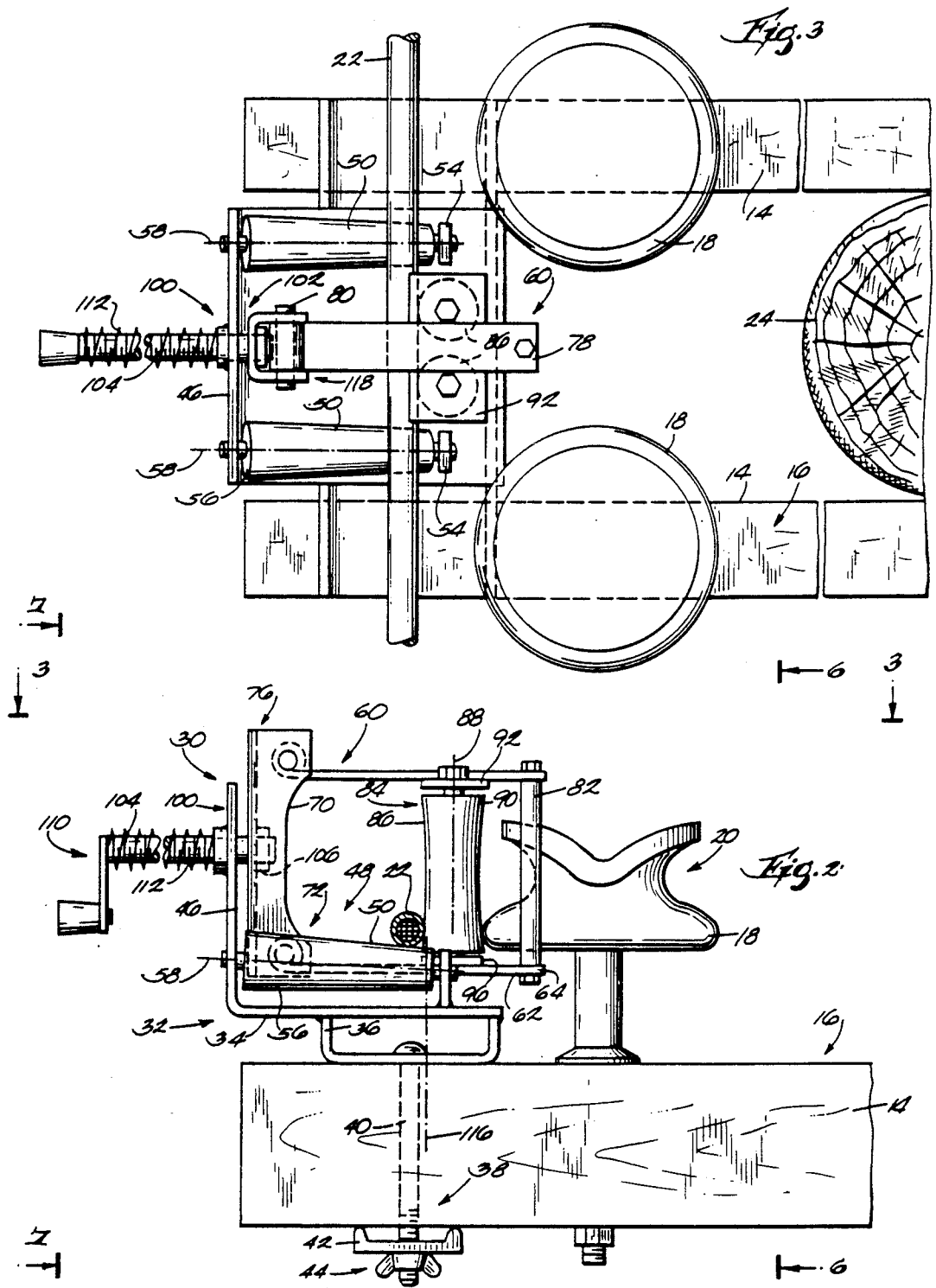

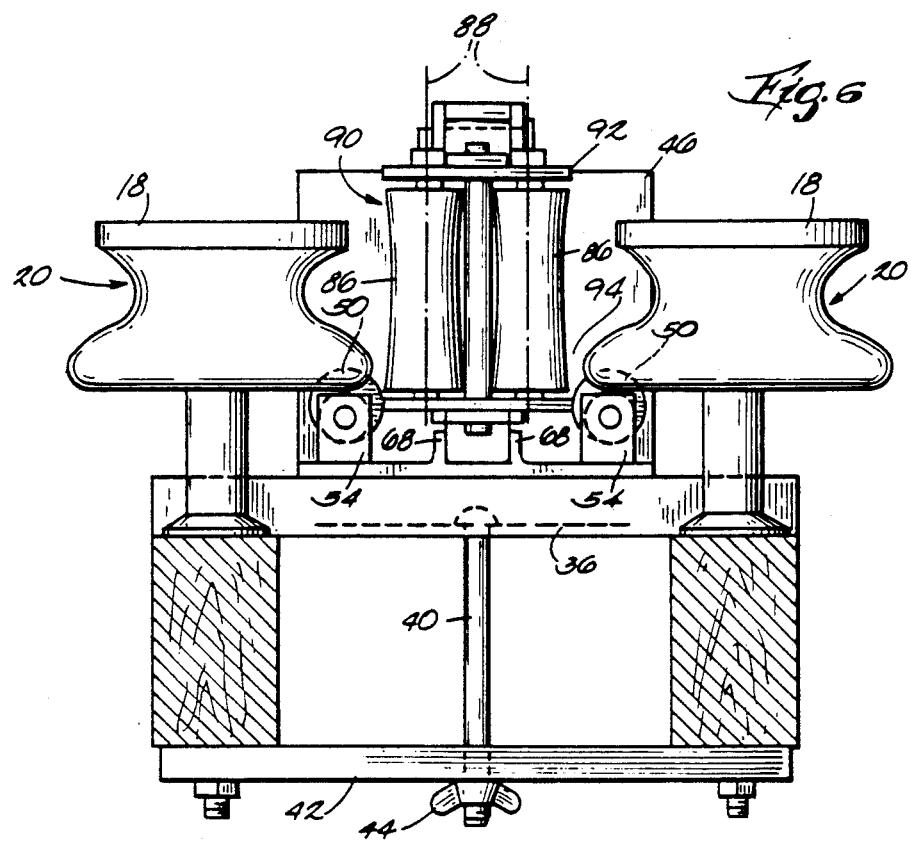
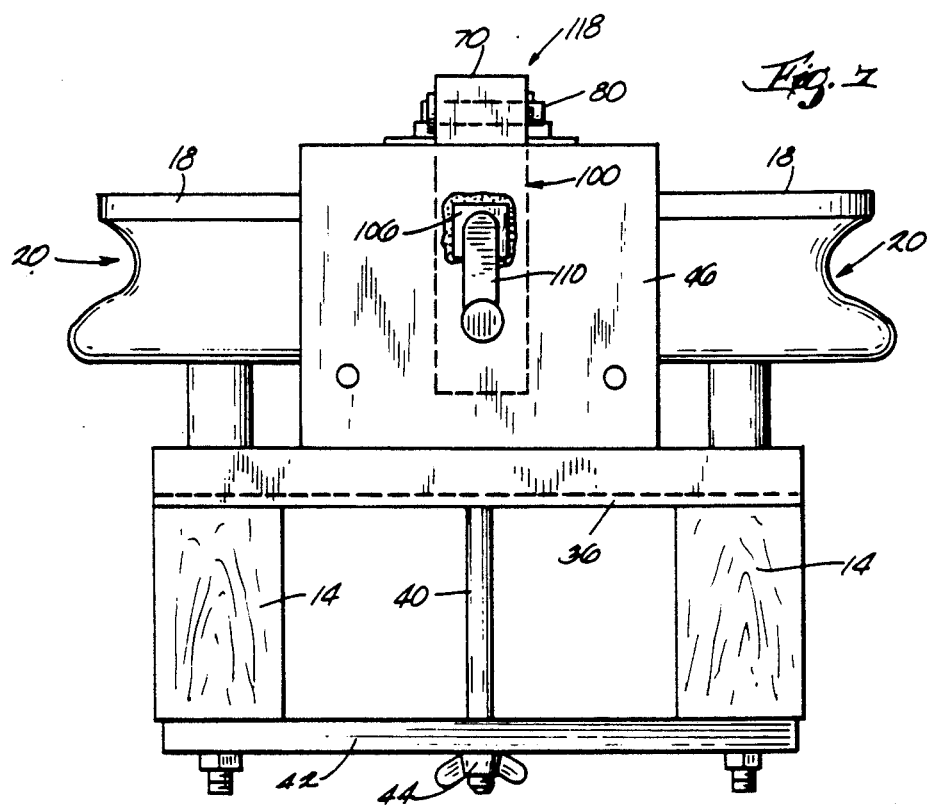

STRINGING BLOCK

BACKGROUND OF THE INVENTION

1. Field of the Invention

The invention relates to cable suspensions, and particularly to equipment for rigging cable suspensions.

2. Description of the Related Art

It is generally known to suspend a cable or conductor from a plurality of aligned and spaced apart utility poles to form a power distribution or communication system, or some similar utility transmission system. Typically the utility poles are characterized by a single crossarm which extends horizontally from the utility pole and which supports the cable. In order to isolate the cable from the crossarm the utility transmission system also includes an insulator which is supported by the upper surface of the crossarm at or near the end of the crossarm and which in turn supports the cable. Known insulators are made of porcelain or some other insulative material, are typically generally cylindrical, and are characterized by an annual groove which extends around the insulator. When suspended, the cable rests in the groove in the insulator.

In order to suspend a cable from a utility pole to form a utility transmission system, the cable must be positioned on the crossarm of the utility pole and then placed under tension and drawn to the desired "sag". "Sag" describes the tension of the cable and reflects the magnitude of deflection of the cable as it extends between utility poles. After the cable is placed under sufficient tension so that the cables extend between utility poles with the desired amount of sag, the cable must be positioned into contact with the groove in the insulator on the crossarm. Because of the relatively large weight of the suspended cable and the tension applied to the cable to provide the desired amount of sag, suspending the conductor and positioning the conductor in the groove of the insulator can be difficult.

In the design of utility transmission systems, it is often desirable for the system layout to include a corner, which requires the cable to follow a sharply curved or cornered path. A corner in a typical utility transmission system is accomplished by suspending the cable from a "corner pole". A corner pole is substantially similar to the typical utility pole described above except that a corner pole generally includes a pair of crossarms extending therefrom. As on the standard utility pole, each crossarm on a corner pole supports an insulator on its upper surface adjacent the end of the crossarm.

Placing the conductor or cable under tension on a corner pole and repositioning the cable on the insulators supported by the pair of crossarms can be particularly difficult because, in addition to the weight and axial tension on the conductor, lateral forces act on the cable to "pull" the cable inwardly of the corner as the cable wraps around the insulators. It is because of the lateral forces which "pull" the cable on the corner pole that require the cable to be supported a pair of insulators supported by dual crossarms.

In the prior art, it is known to use various rigging equipment, such as a block, to suspend the cable from the crossarm of a pole while the cable is drawn into tension. It is also known in the prior art to use additional equipment, such as a hoist, to reposition the cable into contact with the grooved insulator. While such known rigging equipment is capable of suspending equipment from utility poles, rigging a utility transmission system can still be difficult. For example, known rigging blocks are mounted on the crossarm inwardly of the insulator with respect to the utility pole to support the cable as tension is applied to the cable to bring the cable to the desired sag. A hoist or some other device must then be used to lift the cable upwardly and outwardly away from the block, over the insulator, and into contact with the groove in the insulator. Such repositioning of the cable can be difficult because the cable may be under tension in excess of 500 pounds of force depending on the weight of the cable, the "sag" of the cable, and the lateral "pull" of the corner, if any. Lifting the cable upwardly and outwardly to reposition the cable subjects the cable to additional tension. Further, it can be difficult to place a cable in contact with the pair of insulators supported by the dual crossarms of a corner pole in a single operation because of the close proximity of the pair of insulators.

It is an object of the invention to provide a stringing block mountable on the crossarm of a utility pole for rigging a cable for suspension from the utility pole.

It is a further object of the invention to provide a stringing block which supports a cable suspended from a utility pole while the cable is under tension and which positions the cable into contact with an insulator.

It is a further object of the invention to provide a stringing block mountable on a corner pole for supporting and positioning a cable under tension on a pair of insulators without the use of any additional, ancillary equipment.

It is among the other specific objects of the invention to provide a stringing block for rigging a cable on a utility pole, and which can be safely and easily removed from the utility pole once the cable is suspended from the utility pole.

SUMMARY OF THE INVENTION

For the realization of these and other objects, this invention provides a stringing block for rigging a utility transmission system which is releasably mounted on the crossarm of the utility pole to support a cable while the cable is drawn to the desired tension and to position the relatively taut cable on an insulator on the crossarm.

More particularly, the stringing block is adapted for use on a utility pole having at least one crossarm which extends from the utility pole and which supports at least one insulator. The stringing block includes a frame a for releasably securing the stringing block to the crossarm in a position adjacent to the insulator, preferably outward, relative to the utility pole. The frame includes a support preferably a pair of generally horizontally, parallel disposed rollers, so that a cable can be draped thereover and drawn into tension. With that structure the stringing block supports the cable and does not significantly add to the force required to draw the cable to the desired sag.

The stringing block also includes a carriage which is associated with the just mentioned support and which cooperates therewith to support the cable. The carriage is supported for selective horizontal movement and preferably is in the form of a generally open, upright rectangular frame. The carriage also preferably includes a second support which cooperates with the first mentioned support to support the cable. The second support is preferably in the form of a pair of generally vertically disposed rollers which extend between the horizontal members and across the carriage. The vertical rollers support the cable outwardly of the insulators if and when lateral forces pull the cable to the inside of a corner as the cable is drawn to sag.

To rig the utility transmission system, the stringing block of the preferred construction is mounted on a crossarm outwardly of the insulator, relative to the utility pole. The cable is then threaded through the upright frame of the carriage and draped across the horizontal rollers on either side of the carriage. The cable is then drawn to the desired sag between the utility poles. Any lateral forces due to a corner pulls the cable inwardly and into engagement with the pair of vertical rollers on the carriage. The vertical and horizontal rollers thus cooperate to support the cable in a position outwardly of the insulators, with respect to the utility pole, while the cable is placed under tension and drawn upwardly to sag between utility poles.

The stringing block also includes a mechanism for moving the cable into contact with the insulators without subjecting the cable to additional tensile forces or subjecting the insulators to a sudden impact or shock. This mechanism is operative to move the carriage, and the vertical rollers fixed thereto, horizontally toward the insulator and past the insulator so that the cable is transferred from the vertical rollers to the insulator. More particularly, a screw mechanism includes an acuator screw which is rotatably connected to the carriage and which threadedly engages the frame. Rotation of the screw in one direction draws the carriage outwardly away from the insulator, and rotation of the screw in the other direction extends the carriage toward the insulator.

The frame of the stringing block supports the carriage in a position such that once the cable is supported on the vertical roller, the carriage can be moved to approach the insulator and move past the insulator without interference. As the vertical rollers move past the insulators, the cable engages the outer surface of the insulators and rides along the insulators into the insulator groove. As the vertical rollers move beyond the insulators, the cable is left behind on the insulators. In the case of a corner pole having a pair of crossarms suspending a pair of insulators, the carriage moves horizontally to a position between the pair of insulators, thereby repositioning the cable on both of the pair of insulators in a single operation.

So that the stringing block can be safely and easily removed from the utility pole once the cable is suspended from the insulator, the stringing block provides means for selectively pivoting a portion of the carriage away from the frame to provide clearance between the cable and the carriage. When pivoted to that open position the frame may be disassembled for removal from the crossarm.

Various other features and advantages of the invention will become apparent to those skilled in the art upon review of the following detailed description, claims and drawings.

DESCRIPTION OF THE DRAWINGS

FIG. 1 is a perspective view of a portion of a utility transmission system.

FIG. 2 is a side elevation view of a stringing block embodying various features of the invention.

FIG. 3 is a plan view of the stringing block shown in FIG. 2 and taken along line 3—3.

FIG. 4 is a elevation view of the stringing block shown in FIG. 2.

FIG. 5 is an elevation view of the stringing block shown in FIG. 2.

FIG. 6 is an elevation view of the stringing block shown in FIG. 2 and taken along line 6—6.

FIG. 7 is an elevation view of the stringing block shown in FIG. 2 and taken along line 7—7.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION

A portion of a utility transmission system 10 is illustrated in FIG. 1. The illustrated utility transmission system includes a utility pole 12 characterized by a crossarm 14 extending horizontally from the pole 12. The crossarm 14 has an upper surface 16 which supports a generally cylindrical insulator 18 located close to or adjacent the end of the crossarm. The insulator 18 is made of porcelain or some other insulative material and is characterized by an annular groove 20 which extends around the circumference of the insulator 18. Preferably, the insulator 18 has a relatively smooth outer surface.

The illustrated utility transmission system 10 also includes a cable 22 or conductor suspended from the insulators 18 on the utility poles 12 so that each insulator 18 isolates the conductor or cable from the supporting crossarm 14. The cable 22 is supported by the insulators 18 and sags as it extends between the utility poles 12.

The illustrated utility transmission system 10 also includes a corner pole 24 for guiding the cable around a corner. The corner pole 24 is characterized by a pair of generally parallel crossarms 14 extending generally horizontally from the corner pole 24. As with the crossarms 14 supported by the above-described utility pole 12, each of the pair of crossarms 14 on the corner pole 24 supports an insulator 18 near the end of the crossarm and on the upper surface 16 of the crossarm 14.

A stringing block 30 embodying this invention is illustrated in FIG. 2 and being adapted to be mounted on a utility pole 12 having at least one crossarm 14 to support a cable for rigging a utility transmission system. The stringing block 30 supports the cable 22 while the cable 22 is drawn into tension and can be used to position the relatively taut cable into contact with the grooved insulator 18.

In the illustrated embodiment, the stringing block 30 includes a frame 32 having a generally horizontal base plate 34. The base plate 34 is supported by, and is rigidly connected to, a channel 36 which has a U-shaped cross section and which is sufficiently long (see FIG. 3) so as to extend between parallel crossarms on a corner pole. In the preferred embodiment, the base plate is welded to the channel.

The frame also includes means 38 for releasably securing the base plate 34 to the crossarm 14 at a location outwardly of the insulator 18, relative to the utility pole 12. In the illustrated embodiment, the means 38 for releasably securing the base plate 34 includes a clamping bolt 40 which is connected to the channel 36 and which extends downwardly from the bottom of the channel and through a bottom plate 42. The bottom plate 42 is also sufficiently long so as to extend between the dual crossarms 14. A wing nut 44 or some other releasable fastener secures the bottom plate 42 to the lower surface of the crossarm to clamp the crossarm 14 between the channel 36 and the bottom plate 42, thus releasably securing the base plate 34 on the upper surface 16 of the crossarm 14.

Because the stringing block 30 is releasably secured directly to the crossarm 14, and not to the utility pole 12, and because the means for releasably securing the frame to the crossarm utilizes a minimal length of the crossarm, the stringing block 30 can be mounted on the crossarm 14 in a location outwardly of the insulator 18 relative to the utility pole, i.e. so that the insulator 18 is located between the mounted stringing block 30 and the utility pole 12.

The frame 32 also includes a bracket plate 46 which extends upwardly from the outer edge of the base plate 34. The frame 32 also includes first guide means 48 for supporting a cable for low-friction movement of the cable in a direction parallel to the axis of the cable. Preferably, the first guide means 48 is in the form of a pair of horizontal rollers 50, however, other horizontal members providing low-friction support of the cable could be used. Each of the pair of horizontal rollers 50 has a first, inner end 50 supported by a flange 54 which extends upwardly from the base plate 34, and a second, outer end 56 supported by the bracket plate 46. The horizontal rollers 50 are spaced apart and are generally parallel. When the stringing block 30 is mounted on a crossarm 14, each horizontal roller 50 has an axis of rotation 58 which is generally parallel to the crossarm 14 and which is substantially horizontal, but which is inclined slightly downwardly toward the insulator 18. The horizontal rollers 50 have tapered outer surfaces 60 so that the outer circumference of each horizontal roller decreases along the length of the roller from the end 56 of the roller supported by the bracket plate 46 to the end 52 supported by the flange 54. The horizontal rollers 50 are adapted to support thereon a length of cable and to rotate to provide for low-friction movement of the cable as the cable is drawn to the desired sag.

The stringing block 30 also includes a movable carriage 60 supported by the frame 32 between the horizontal rollers 50 for horizontal movement of the carriage 60 relative to the frame 32. As shown in FIG. 3 and FIG. 6, when the stringing block is mounted on a corner pole, the carriage is supported by the frame in a position intermediate the length of the base plate and between the pair of insulators. The carriage 60 has the form of an upright, generally open rectangular box and includes four interconnected carriage members. The carriage 60 includes a horizontally extending lower member 62 which is supported by the base plate 34 and which has an inner end 64 and an outer end 66. As shown in FIG. 6, the lower member 62 is slidably supported by a pair of support flanges 68 which extend upwardly from the base plate 34. The carriage 60 also includes a vertically extending leg 70 which is adjacent the bracket plate 46. The vertical leg 70 has a lower end 72 which is hingedly connected to the outer end 66 of the lower leg 62. As shown in FIG. 3, the vertical leg 70 is a channel which has a U-shaped cross-section. As described below, the vertical leg 70 and the lower member 62 are hinged for relative pivotal movement about a generally horizontal axis 74. Releasably connected to the upper end 76 of the vertical leg 70 is a horizontally extending upper member 78 which extends from the vertical leg 70 inwardly toward the utility pole 12. As described below, a locking pin 80 extends through the upper member 78 and the upper end of 76 of the vertical leg 70 to releasably connect the upper member 78 and the vertical leg 70. A support leg 82 extends vertically between the inner ends of the lower member 62 and the upper member 78 to rigidly connect the upper and lower members 62,78.

The carriage 60 also includes second guide means 84 for supporting a cable for low-friction movement of the cable in a direction parallel to the axis of the cable. Preferably, the second guide means 84 is in the form of a second pair of rollers 86 extending between the upper and lower members 62,78 and located inside the carriage 60. The vertical rollers 86 have generally vertical axes of rotation 88 and are supported at their upper ends 90 by an upper roller support plate 92, and at their lower ends 94 by a lower roller support plate 96. As shown in FIG. 2 and FIG. 6, the vertical rollers 86 have a slight hour-glass form so that the circumferences of the vertical rollers 86 decrease from the upper and lower ends 90, 94 to the middle portions of the vertical rollers 86 i.e., generally concave.

The vertical rollers 86 support the cable 22 when the cable 22 is drawn to the desired sag if any lateral forces act on the cable 22 to pull the cable inwardly. As shown in FIG. 3, when the cable is pulled into contact with the vertical rollers 86, the vertical rollers 86 support the cable 22 outside the insulators 18, relative to the utility pole 12.

The stringing block 30 also includes means 100 supported by the frame 32 for moving the cable 22 into engagement with the insulator 18. In the illustrated embodiment, the means 102 for moving the cable includes means for moving the carriage 60 horizontally relative to the insulator. In the preferred embodiment, the means 102 includes an actuator screw 104 which is rotatably connected to the vertical leg 70 of the carriage 60 intermediate the upper 76 and lower end 72 of the vertical leg 70 and which extends through the bracket plate 46 outwardly of the crossarm 14. The actuator screw 104 engages the vertical leg 70 (see FIG. 7) by means of a nut 106 which is rigidly fastened to the end of the actuator screw 104 and which rotates freely inside the U-shaped channel of the vertical leg 70. The means 102 for moving the carriage also includes a thrust washer 108 which is fixed to the outer surface of the bracket plate 46. The actuator screw 104 threadedly engages the thrust washer 108. The actuator screw 104 also includes, on its outermost end, a crank handle 110. A spring 112 surrounds the actuator screw 104 and engages the thrust washer 108 and a washer 114 adjacent the crank handle 110 to bias the actuator screw 104 in an outwardly direction.

Rotation of the actuator screw 104 causes horizontal displacement of the carriage 60 relative to the frame 30. The carriage 60 is movable between (See FIG. 2) a first, retracted position and (See FIG. 4) a second, extended position. In the retracted position, the outer surface of each vertical roller 50 lies in a vertical plane 116 extending between the inner and outer ends 52, 56 of each of the pair of horizontal rollers 50. In other words, when the carriage 60 is in the retracted position, the outer surface of each vertical roller 86 is located outward of the first 52 end of the horizontal rollers 50. Such an arrangement permits the cable 22 to contact all four rollers (two horizontal, two vertical) as the cable is drawn to sag. As the cable 22 is drawn to the desired tension, the horizontal rollers 50 allow movement of the cable 22 in a direction along the axis of the cable and support the cable. If any lateral forces pull the cable 22 inwardly, the vertical rollers 86 support the cable 22 for low-friction movement of the cable 22 and hold the cable 22 laterally in position. Thus, the stringing block 30 supports the cable 22 outside of the insulators 18 while the cable 22 is under tension and drawn to the desired sag.

Once the cable 22 is drawn to the desired sag, the stringing block 50 can be used for moving the cable 22 into engagement with the groove 20 on the insulator 18 in a controlled manner and without introducing additional tension to the cable 22. Rotation of the actuator screw 104 moves the carriage 60 horizontally and inwardly away from the the bracket plate 46 and toward the insulators 18. As the carriage 60 moves away from the bracket plate 46, the vertical rollers 86 move horizontally relative to the horizontal rollers 50 and toward the insulator 18. Because of the slight inclination of the outer surface of each horizontal roller 50, as the carriage 60 moves inwardly toward the insulator 18, the cable 22 moves freely away from the outer surface of the horizontal rollers 50. Due to lateral tension on the cable 22 and the hour-glass shape of the vertical rollers 50, the cable 22 remains in contact with the vertical rollers 86 and do not slide down even as the vertical rollers 86 move away from the horizontal rollers 50 and past the inner ends 52 of the horizontal rollers 50.

Because the carriage 60 is located between the insulators 18 (See FIG. 6), rotation of the actuator screw 104 moves the carriage 60, and the vertical rollers 86 supporting the cable 22, between the insulators 18 without interference between the carriage 60 and the insulators 18. As the carriage 60 moves toward its fully extended position (See FIG. 4), the cable 22 engages the relatively smooth outer surface of the insulator 18. As the vertical rollers 86 move past the insulator 18, the cable 22 rides along the smooth outer surface of the insulator 18 and seats itself in the groove 20. As the carriage 60 moves to a fully extended position, the vertical rollers 86 leave the cable 22 behind on the insulator 18. Because the cable is initially rigged on the crossarms 121 at a position outward of the insulator 18, the cable 22 need not be repositioned by lifting the cable 22 upwardly and outwardly over the insulator 18. Thus, no additional tension is introduced to the cable 22 as it is positioned into the groove 20 on the insulator 18.

In order to provide for safe and easy removal of the stringing block 30 from the crossarm 14 once the cable 22 is seated in the groove 20, the stringing block 30 includes means 118 for pivoting the horizontal rollers 86 about a horizontal axis 74 extending generally parallel to the axis of the cable 22 to remove the stringing block 30 from the crossarm 14. In the illustrated embodiment, the means for permitting rotation of the vertical rollers 86 includes the locking pin 80 which releasably connects the outer end 66 of the upper member 62 and the upper end 76 of the vertical leg 70. Removal of the locking pin 80 permits a portion of the carriage including the upper member 78, the support leg 82, and the lower member 62, as well as the vertical rollers 86, to pivot about the horizontal axis 74 defined by the hinged connection between the lower member 62 and the vertical leg 70. Once the locking pin 80 has been removed and the vertical rollers 86 are pivoted downwardly away from the cable 22 (See FIG. 5), the vertical rollers and their associated supports can be disassembled by removal of the pivot hinge defining axis 74 and the wing nut 44 connecting the bottom plate 42 to the clamping bolt 40 can be released and the stringing block 30 can be removed from the crossarm 14.

In operation, the stringing block 30 facilitates rigging of the utility transmission system 10. Typically, a rope or line is threaded through several stringing blocks attached to the crossarms of a plurality of utility poles. The rope is connected to a cable and is drawn through the stringing blocks. The cable follows the rope and is also strung through the stringing blocks. Once the cable 22 is draped over the horizontal rollers 50 of the stringing blocks 30, the cable 22 is put under tension and drawn to the desired sag. Once the cable 22 is drawn to the desired sag, operation of the actuator screw 104 on each stringing block 30 provides controlled movement of the carriage 60 relative to the insulator 18 to position the relatively taut cable 22 into engagement with the groove 20 without introducing additional tension to the cable 22. The described stringing block can be supported on crossarm 14 to suspend the cable on insulator 18, but stringing is not as critical at a straight run, non-corner pole.

Various features of the invention are set forth in the following claims.

I claim:

1. A stringing block for use on a utility pole having means defining a crossarm support and cable insulating means on the crossarm support, the stringing block comprising
   a frame including a base plate, means for releasably securing said base plate on the crossarm at a location outwardly of the insulator, a first roller means supported by said base plate and having an outer surface inclined downwardly toward the insulator and being adapted to support thereon a cable, and
   means supported by said frame for moving the cable into engagement with the insulator, the means for moving the cable including a carriage slidably mounted for movement relative to the base plate and having second roller means including a generally vertical axis of rotation and being adapted to support the cable, and means for moving said vertical axis of said second roller means horizontally relative to the insulator.

2. A stringing block as set forth in claim 1 wherein said frame supports said carriage for relative movement thereto, and wherein said means for moving said second roller means includes means for moving said carriage.

3. A stringing block as set forth in claim 2 wherein said means for moving said second roller means includes an actuator screw threadedly engaged with said frame and rotatably connected to said carriage.

4. A stringing block as set forth in claim 1 wherein said carriage includes means for affording pivotable rotation of said second roller means about a horizontal axis extending generally parallel to the axis of the cable.

5. A stringing block as set forth in claim 4 wherein said carriage includes a vertical leg, and wherein said means for affording pivotable rotation of said second roller means includes a lower leg supporting said second roller and being hingedly connected to said vertical leg, and wherein said rotation means includes means for releasably securing said second roller means in a vertical position.

6. A stringing block as set forth in claim 5 wherein said means for releasably securing said second roller means includes a support member having a first end connected to said lower leg and a second end releasably connected to said vertical leg.

7. A stringing block for use on a utility pole having at least one crossarm supporting at least one insulator, the stringing block comprising
a frame,
means for selectively stationarily securing said frame to the at least one crossarm in a location on the crossarm adjacent the insulator,
first guide means on said frame for supporting a cable for low-friction movement of the cable, and
means supported by said frame for moving the cable into engagement with the insulator when said frame is stationarily secured to the at least one crossarm, the means for moving the cable including a carriage having second guide means for supporting the cable for low-friction movement in a direction parallel to the axis of the cable, means for supporting said second guide means and for affording selective rotation of said second guide means about a horizontal axis extending generally parallel to the axis of the cable, and means for incrementally moving said horizontal axis of rotation relative to the insulator.

8. A stringing block as set forth in claim 7 wherein said carriage includes a vertical leg and wherein said means for supporting said second guide means includes a lower leg supporting said second guide means and being hingedly connected to said vertical leg and a support leg having one end interconnected with said lower leg and another end releasably connected with said vertical leg.

9. A stringing block as set forth in claim 8 wherein said means for moving the cable further includes means for moving said carriage in a horizontal direction relative to said frame.

10. A stringing block for use on a utility pole having at least one cross arm supporting at least one insulator, the stringing block comprising a frame, means for securing said frame to the at least one crossarm in a location on the crossarm adjacent the insulator, guide means on said frame for supporting a cable for low-friction movement of the cable, and means supported by said frame for moving the cable into engagement with the insulator, the means for moving the cable including a carriage having second guide means for supporting the cable for low-friction movement in a direction parallel to the axis of the cable and means for supporting said second guide means and for affording selective rotation of said guide means about a horizontal axis extending generally parallel to the axis of the cable, said carriage including a vertical leg, said means for supporting said second guide means including a lower leg supporting said second guide means and being hingedly connected to said vertical leg and a support leg having one end interconnected with said lower leg and another end releasably connected with said vertical leg, said means for moving the cable including means for moving said carriage in a horizontal direction relative to said frame, said means for moving said carriage including an actuator screw threadedly engaged with said frame and having an end rotatably connected to said vertical leg.

11. A stringing block as set forth in claim 10 wherein said carriage includes a vertical leg, a lower leg having an end hingedly connected to said vertical leg and supporting said second guide means, an upper leg releasably connected to said vertical leg, and a support leg extending between said upper leg and said lower leg.

12. A stringing block as set forth in claim 11 wherein said second guide means is a roller extending between said upper and lower legs.

13. A stringing block for use on a utility pole having at least one crossarm supporting at least one insulator, the stringing block comprising
a frame,
means for securing said frame to the at least one cross arm at a location on the at least one crossarm adjacent the insulator,
first guide means on said frame for supporting a cable for low-friction movement of the cable in a direction along the axis of the cable, and
means supported by said frame for moving the cable into engagement with the insulator, the means for moving the cable including a carriage slidably supported by said frame, second guide means supported by said carriage for supporting the cable for low-friction movement of the cable in a direction parallel to the axis of the cable and means for incrementally moving the carriage relative to said frame in a generally horizontal direction generally perpendicular to the axis of the cable.

14. A stringing block for use on a utility pole having at least one crossarm supporting at least one insulator, the stringing block comprising a frame, means for securing said frame to the at least one crossarm at a location on at least one crossarm adjacent the insulator, first guide means on said frame for supporting a cable for low-friction movement of the cable in a direction along the axis of the cable, and means supported by said frame for moving the cable into engagement with the insulator, the means for moving the cable including a carriage, second guide means supported by said carriage for supporting the cable for low-friction movement of the cable in a direction parallel to the axis of the cable and means for moving said carriage relative to said frame in a generally horizontal direction generally perpendicular to the axis of the cable, said means for moving said carriage including an actuator screw threadedly engaged with the frame and rotatably connected to said carriage.

15. A stringing block as set forth in claim 14 wherein said first guide means includes a roller having a generally horizontal axis of rotation, and wherein second guide means includes a second roller having a generally vertical axis of rotation.

16. A stringing block as set forth in claim 15 wherein said first roller has a first inner end and a second outer end and wherein said carriage is moveable between a first position wherein the outer surface of said second roller lies in a vertical plane which extends between said first and second ends of said first roller, and a second position such that said axis of said second roller lies in a vertical plane which extends outside said first and second ends.

17. A stringing block as set forth in claim 13 wherein said carriage includes means for selectively rotating said second guide means about a generally horizontal axis extending generally parallel to the axis of the cable.

18. A stringing block as set forth in claim 17 wherein said first guide means includes a roller having an axis of rotation in a generally horizontal plane, and wherein said second guide means includes a second roller having an axis of rotation in a generally vertical plane.

19. A stringing block as set forth in claim 18 wherein said carriage includes a vertical leg rotatably connected to said actuator screw, a lower leg hingedly connected to said vertical leg and supporting said first roller, and means for releasably securing said lower leg and for maintaining said second roller in a generally vertical orientation.

20. A stringing block for use on a utility pole having means defining a crossarm support and cable insulating means on the crossarm support, the stringing block comprising a frame including a base plate, means for releasably securing said base plate on the crossarm at a location outwardly of the insulator, a first roller means supported by said base plate and having a substantially horizontal axis of rotation and having an outer surface inclined downwardly toward the insulator and being adapted to support thereon a cable, and means supported by said frame for moving the cable into engagement with the insulator, the means for moving the cable including a carriage having second roller means including a generally vertical axis of rotation and being adapted to support the cable, and means for moving said second roller means horizontally relative to the insulator, the frame supporting said carriage for relative movement thereto, and said means for moving said second roller means including means for moving said carriage, said means for moving said second roller means including an actuator screw threadedly engaged with said frame and rotatably connected to said carriage.

* * * * *